United States Patent [19]

Sherman

[11] 4,100,069
[45] Jul. 11, 1978

[54] TWO-STAGE PULP THICKENING

[75] Inventor: Michael I. Sherman, Glens Falls, N.Y.

[73] Assignee: Kamyr, Inc., Glens Falls, N.Y.

[21] Appl. No.: 772,928

[22] Filed: Feb. 28, 1977

[51] Int. Cl.² .......................... D21C 9/18; B01D 33/00
[52] U.S. Cl. .................................. 210/109; 68/181 R; 210/342
[58] Field of Search ............ 68/181 R; 209/255, 258, 209/268, 355; 210/116, 341, 342, 19, 322, 332, 384, 385, 388, 389, 407, 109

[56] References Cited

U.S. PATENT DOCUMENTS

| 651,621 | 6/1900 | Black et al. ......................... 210/342 |
| 2,598,322 | 5/1952 | Vokes .................................. 210/342 X |
| 3,078,703 | 2/1963 | Richter et al. ...................... 68/181 R |
| 3,292,790 | 12/1966 | Tuit et al. ........................ 210/332 X |
| 3,524,551 | 8/1970 | Richter ........................... 68/181 R X |
| 3,579,420 | 5/1971 | Richter ............................ 210/388 X |
| 3,704,603 | 12/1972 | Richter ........................... 68/181 R X |
| 3,815,386 | 6/1974 | Gullichsen et al. ............... 68/181 R |

FOREIGN PATENT DOCUMENTS 46-14,199  4/1971  Japan ................................. 210/342

Primary Examiner—Charles N. Hart
Assistant Examiner—Robert H. Spitzer
Attorney, Agent, or Firm—Cushman, Darby & Cushman

[57] ABSTRACT

An apparatus for thickening pulp at the bottom of a diffusion washing tower. Two sets of concentric screens are provided, each screen set comprising a plurality of radially spaced screens, the screens of one of the screen sets being radially offset from the screens of other screen sets. A plurality of hollow mounting arms each commonly mount the screen sets and are in operative fluid communication with at least some of the screens of the screen sets. Screened liquid is withdrawn from the hollow mounting arms, and the hollow mounting arms and screen sets are axially reciprocated during the screening operation. Control of the homogeneity of the pulp is effected by preventing fluid communication between the interior of screens of the different screen sets, and two separate withdrawal devices are provided, one for withdrawing liquid only from one of the screen sets, and one for withdrawing liquid only from the other of the screen sets. The operation of the two withdrawal structures can be controlled so that extraction flow rates from the sets are substantially equal.

2 Claims, 3 Drawing Figures

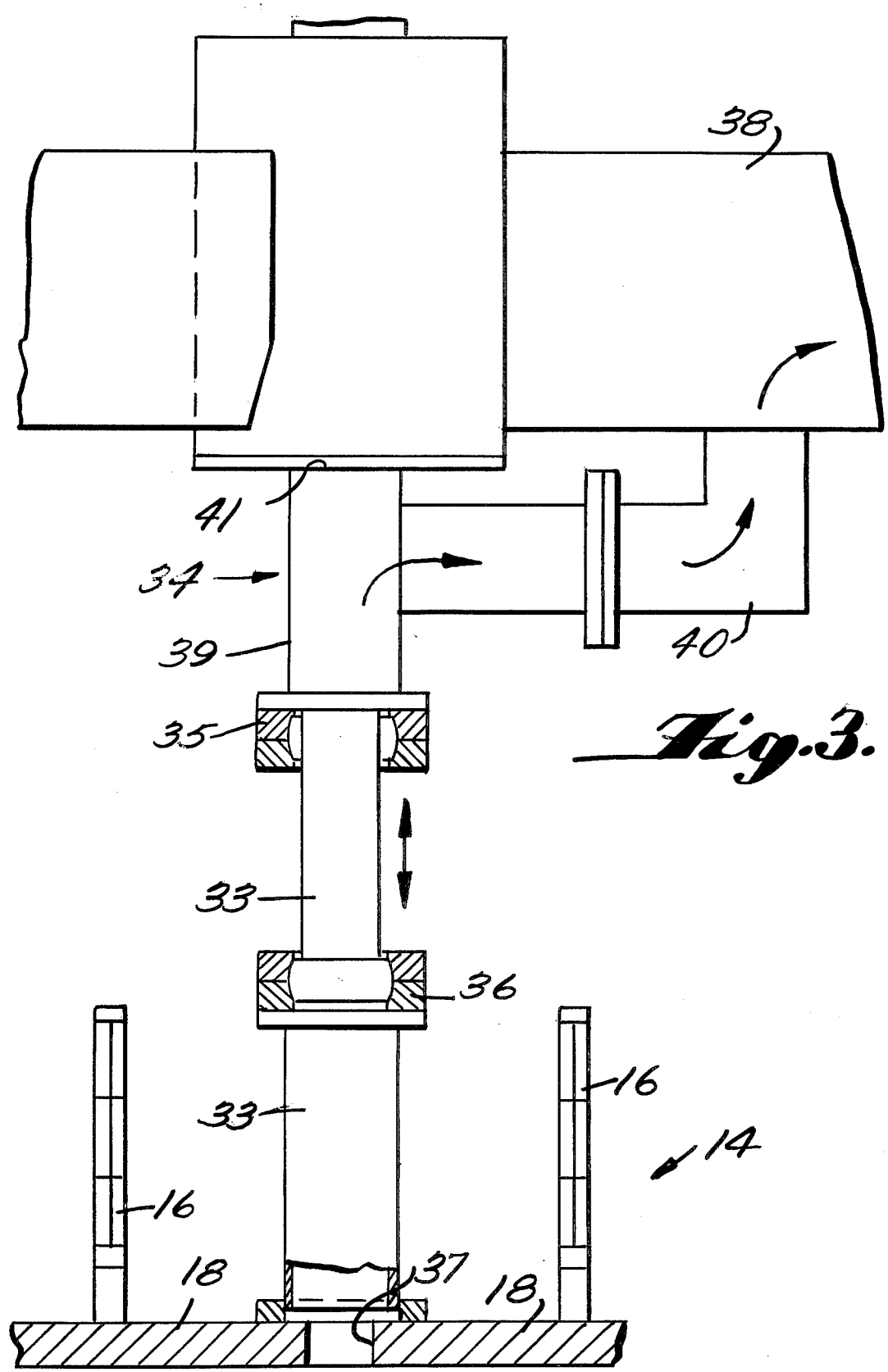

TWO-STAGE PULP THICKENING

BACKGROUND AND SUMMARY OF THE INVENTION

The invention relates to an apparatus for the thickening of brown stock (or bleached stock) pulps from a continuous digester in the lower end of a diffusion washing tower in order to reduce the amount of liquid mixed with the pulp and thereby reduce the amount of liquid extraction necessary in the diffusion washing stages as the pulp moves upwardly in the tower. A conventional diffusion washing tower is shown in U.S. Pat. No. 3,524,551, and in patent application Ser. No. 621,561 filed Oct. 10, 1975 (which is commonly assigned with the present application). Such a structure includes two sets of concentric screens, one set being located above the other, preferably located at the bottom of a diffusion washing tower. The individual screen rings of each set are staggered radially from those of the other set, and the sets are mounted to three or more hollow radial arms which are mounted to an equal number of hydraulic cylinders that reciprocate the screens up and down and provide an exit passageway for removal of the extracted liquid. Conventionally, the liquor extracted through the screen sets is drawn through the common arms and then through the outlets. As the pulp moves upwardly in communication with the upper set of screens, liquor is drawn in the opposite radial direction than it is drawn when passed by the lower set of screens. This opposite liquor drawing performs complete and homogeneous thickening throughout the cross section of the tower before contact of the pulp with the upper diffusion washing stages. The homogeneous cross section thickening is totally dependent upon the rates of liquor extractions at the screen sets, however, and presently there is no control that may be exercise over this homogeneity. The division of extraction flows between the screen sets is quite erratic in nature during conventional operation and the thickening of pulp at the lower screens can reduce the flow through the screen range resulting in an increased flow through the upper screens until thickening on the upper screens causes a reversal of this imbalance, etc.

According to the present invention, the imbalance that results in the prior art may be corrected by separating the flows between the screen sets, and providing two separate suction sources to balance the extraction flow rates of liquid through the first and second screen sets. In this way, a truly homogeneous thickening takes place across the entire cross section of the tower before contact of the pulp with the upper diffusion washing stages.

According to the present invention, means are provided for preventing fluid communication between the interior of screens of the first acreen sets and the interior of screens of the second screen sets, and the withdrawl means comprises first and second withdrawing means, the first withdrawing means for withdrawing screened liquid radially outwardly and only from the first screen set, while the second withdrawing mmeans is for withdrawing screened liquid outwardly (either axially or radially) and only from the second screen set. The second withdrawing means comprises a tubular shaft concentric with the screens of the second screen set and extending axially vertically upwardly from the screens of the second screen set, a stationary withdrawal conduit in fluid communication with the tubular shaft, and bushing means for allowing liquid tight axially slidable engagement between the tubular shaft and the stationary withdrawal conduit. In this way, full advantage may be taken of the entire cross sectional area of conventional withdrawal means while still providing the two separate suction, source withdrawal according to the invention, and it is relatively simple to retrofit existing structures to function to accomplish the results of homogeneous thickening across the entire cross section of a tower. The suction sources associated with the first and second withdrawing means are controlled to balance the extraction flow rates of liquid through the first and second screen sets to provide the desired homogeneity.

It is a primary object of the present invention to provide an improved apparatus for the thickening of pulp in a conventional diffusion washing tower. This and other objects of the invention will become clear from an inspection of the detailed description of the invention and from the appended claims.

BRIEF DESCRIPTION OF THE DRAWINGS

FIG. 3 is a detailed view of the axially located withdrawal means according to the exemplary invention illustrated in FIG. 1.

DETAILED DESCRIPTION OF THE INVENTION

Figure 1:
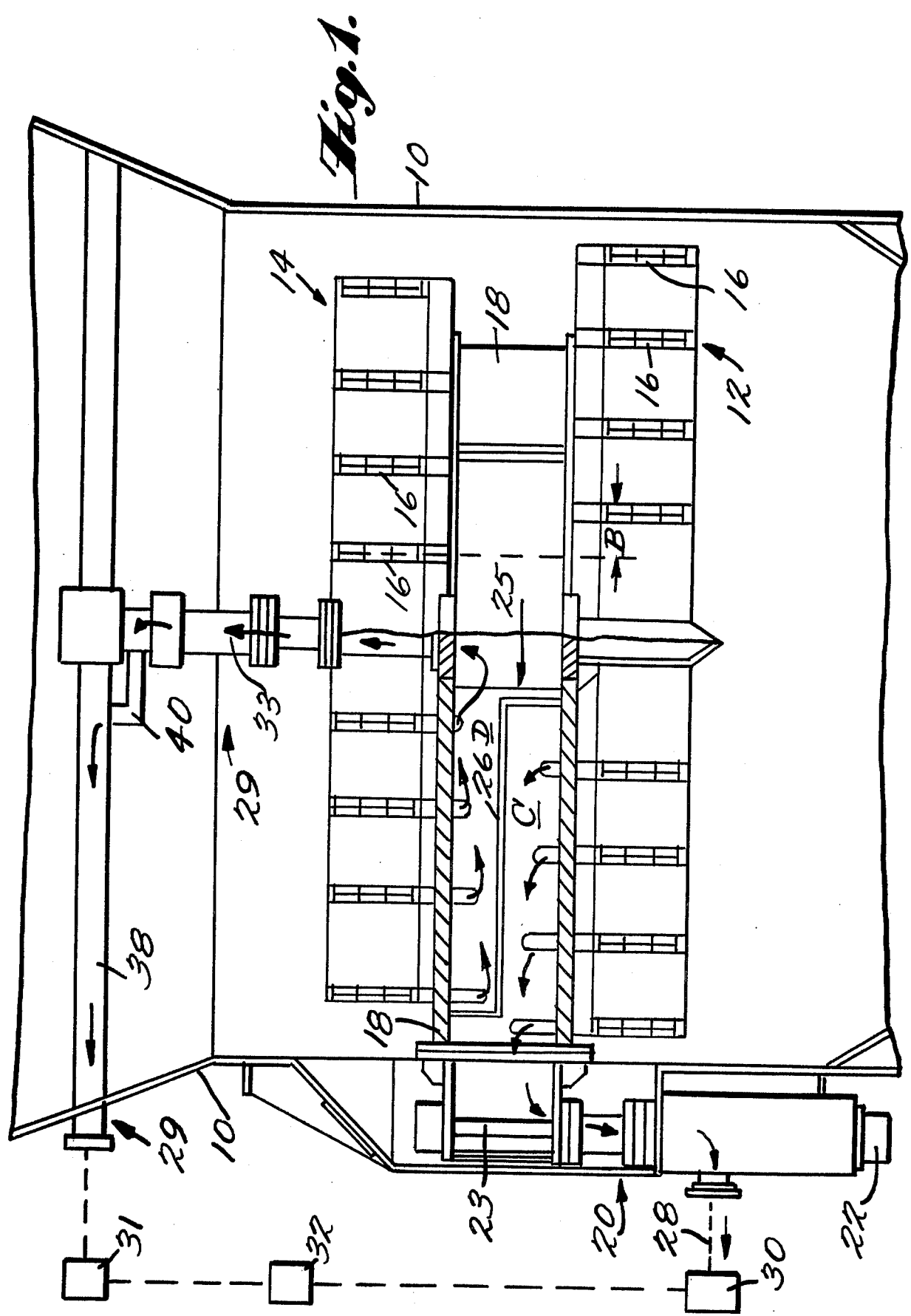
FIG. 1 is a side view, partly in cross section and partly in elevation, of exemplary apparatus according to the present invention.
Figure 2:
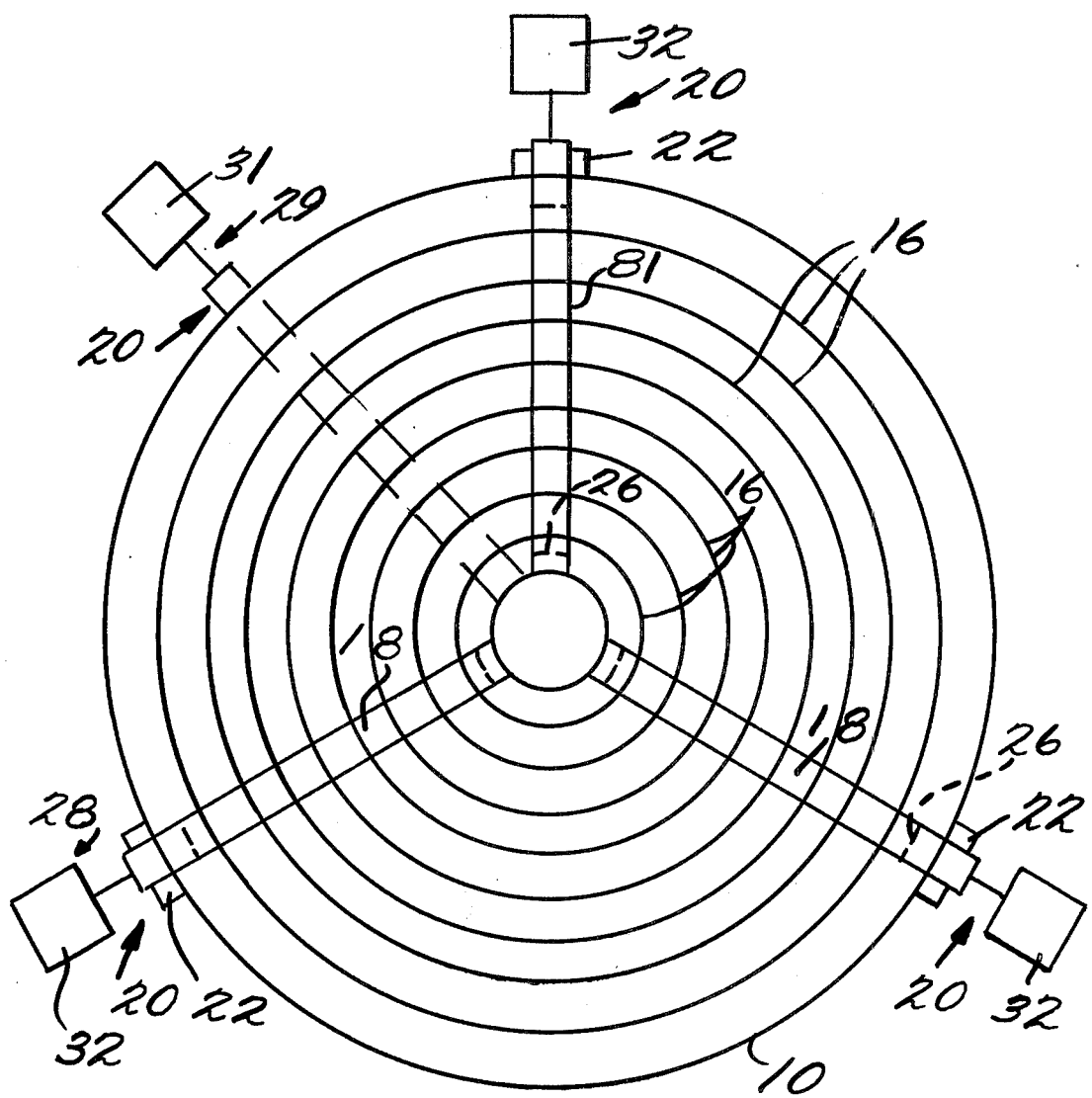
FIG. 2 is a diagrammatic top plan view of exemplary apparatus according to the invention.

A conventional diffusion washing tower is shown generally at 10 in the drawing; only the bottom portion of the tower 10 is shown in FIG. 1, however, it is to be understood that the upper portions of the tower may comprise a conventional diffusion washing structure such as shown in commonly assigned U.S. application Ser. No. 621, 561. As is conventional, the pulp thickening apparatus according to the present invention comprises two sets of conentric screens 12, 14 mounted at the bottom of the tower 10, each set being vertically spaced from the other and the lowermost screen set 12 comprising a first screen set and the uppermost screen set 14 comprising a second screen set. Each screen set comprises a plurality spaced screens 16, the screens of the first screen set 12 beiing radially offset — as shown by dimension B in FIG. 1 — from the screens of the second sreen set 14. A plurality of hollow mounting arms 18 ar provided each commonly mounting the screens sets 12, 14 and in operative fluid communication with at least some of the screens 16 of the screen sets 12, 14. Means 20 are provided for withdrawing screened-out liquid from the hollow mounting arms, and means 22 — such as conventional hydraulic cylinders connected through rods 23 to respective arms 18 — are provided for axially reciprocating the mounting arms 18 and the screen sets 12, 14 connected thereto. The axially reciprocating means 22 may comprise conventional hydraulic cylinders for moving the screens 16 at substantially the same velocity as the pulp flow in the upward direction, and moving the screens 16 very quickly downwardly to begin another upward stroke, or the means 22 may comprise oscillating means such as shown in commonly assigned patent application Ser. No. 748,286 filed Dec. 7, 1976, the disclosure of which is hereby incorporated by reference in the present application.

The improvement according to the present invention comprises means 25 for preventing fluid communication between the interior of the screens of the first screen set 12 and the interior of the screens of the second screen set 14 — which means 25 may comprise walls 26 for dividing each of the hollow mounting arms 18 into first and second chambers C and D respectively, each first chamber C communicating with the screens 16 of the first acreen set 12 only, and each set second chamber D communicating with the screens 16 of the second screen set 14 only — and the withdrawing means 20 comprising first 28 and second 29 withdrawing means. The first withdrawing means 28 comprises a first suction source 30 for withdrawing screened liquid generally radially outwardly from and only from the first screen set 12 (from chamber C) and the second withdrawing means 29 comprising a suction source 31 for withdrawing screened liquid generally axially and then radially outwardly (or just radially outwardly) from and only from the second screen set 14. Means 32 are provided for controlling operation of the first and second suction sources 30, 31 respectively to substantially balance extraction flow rates of liquid through the first and second screen sets 12, 14 respectively. The structure 32 may comprise any conventional control arrangement such as variable speed motors for the suction sources 30, 31, suitable flow rate indicators disposed in the lines leading to the suction sources 30, 31 and circuitry means for controlling the speed of operation of each of the motors for sources 30, 31 (by controlling) the variable resistors therefor) in response to the respective flow rates.

The first withdrawal means 28 according to the present invention preferably comprises a conventional conduit associated with conventional hydraulic cylinders 22, so that the structure according to the present invention may easily be retrofitted into existing structures. The second withdrawing means 29 according to the invention comprises a tubular shaft 33 (see FIG. 3 in particular) concentric with the screens of the second screen set and extending axially vertically upwardly from the screens 16 of the second screen set 14, a stationary withdrawal conduit 34 in fluid communication with the tubular shaft 33, and bushing means 35 for allowing liquid tight axially slidable engagement between the shaft 33 and conduit 34. The shaft 33 may be provided in two parts, a stationary bushing 36 separating the two component parts, the upward component part being in sliding engagement with the bushing 35. A concentric opening 37 is provided at the intersection of the arms 18 for providing fluid communication between the arms 18 and the shaft 33. Preferably, as shown most clearly in FIG. 3, the stationary withdrawal conduit 34 comprises a radially extending hollow support arm 38, an axially extending tubular shaft portion 39 axially mounted to the bushing means 35, and a right angle elbow conduit 40 connecting the tubular shaft portion 39 to the radially extending arm 38. Flow through the tubular shaft portion 39 in the axial direction is prevented by the mounting plate 41 or like structure, the flow being directed into the right angle elbow 40. The arm 38 exits the vessel 10 as shown in FIG. 1. According to this arrangement, full positive flow may be provided from each of the screen sets, no restrictive openings or the like being provided and no necessity for running two separate lines through a single conduit being necessary, and subsequently the control of the control of the flow rates through the withdrawal means 28 and 29 can be exactly determined. Thus, completely homogeneous pulp across the cross section of the diffusion washing tower can be achieved.

The apparatus according to the present invention having been described, the method of using the apparatus according to the present invention will now be set forth: According to the present invention a method of using the apparatus for thickening pulp in a diffusion washing tower 10 is provided, the diffusion washing tower having two sets of concentric screens 12, 14 located at the bottom of the tower, said sets being commonly mounted on radially extending arms 18 and each set being vertically spaced from the other and comprising a first lowermost screen set and a second uppermost screen set. The pulp is forced upwardly past the first and second screen sets, liquid is withdrawn from the pulp passing past the screen sets to thereby increase the solids concentration of the pulp, the commonly mounted screen sets are axially reciprocated (by 22) during withdrawal of the liquid therefrom, and subsequent to thickening of the pulp diffusion washing of the pulp takes place as it subsequently moves upwardly in the treatment tower. The improvement according to the invention comprises the steps of preventing fluid communication between the interiors of screens 16 of the first and second screen sets, withdrawing liquid (through 28) from the interior of the screens of the first screen set, generally radially and separately from the withdrawal of liquid (through 29) from the interior of the screens of the second screen set which is generally axially and then outwardly withdrawn, and controlling the liquid extraction flow rate (by suction sources 30, 31 and control means 32) from the first and second screens sets 12, 14 so that the extraction flow rates from said sets 12, 14 are substantially equal. This results in completely homogeneous treatment of the pulp across the cross section of the tower 10, eliminating the discrepancy between the rates of liquor extraction at the different screen sets (and the subsequent non-homogeneity) that are inherent in the prior art.

While the invention has been herein shown and described in what is presently conceived to be the most practical preferred embodiment thereof, it will be apparent to those of ordinary skill in the art that many modifications may be made thereof within the scope of the invention, which scope is to be accorded the broadest interpretation of the appended claims so as to encompass all equivalent structures.

What is claimed is:

1. Apparatus for screening pulp comprising
   two sets of concentric screens mounted in a tower, each set being vertically spaced from the other, the lowermost screen set being a first screen set, and the uppermost screen set being a second screen set, and each screen set comprising a plurality of radially spaced screens;
   the screens of said first screen set being radially offset from the screens of said second screen set;
   a plurality of hollow mounting arms between said screen sets and each commonly mounted said screen sets and in operative fluid communication with at least said some of screens of said screen sets, each of said hollow mounting arms being in communication with screens of each of said first and second screen sets;
   means for dividing each of said hollow mounting arms into first and second chambers to prevent fluid communication between the interior screens of said first and second screen sets;

first and second withdrawing means for withdrawing screened-out liquid from said mounting arms, said first withdrawing means comprising a suction source for withdrawing screened liquid generally radially outwardly from said first screen set; said second withdrawing means comprising a suction source for withdrawing screened liquid axially and then radially outwardly from said second screen set;

said second withdrawing means further comprising a tubular shaft concentric with said screens of said second screen set and extending axially vertically upwardly from said screens of said second screen set; a stationary withdrawal conduit in fluid communication with said tubular shaft; bushing means for providing liquid-tight axially slidable engagement between said tubular shaft and said stationary withdrawal conduit; and a radially extending hollow support arm mounted in the tower vertically above said stationary withdrawal conduit, and supporting said withdrawal conduit, said hollow support arm being in fluid communication with said withdrawal conduit;

means for controlling operation of said first and second suction sources to substantially balance extraction flow rates of liquid through said first and second screen sets; and means for axially reciprocating said hollow mounting arms and screen sets connected thereto; whereby liquid-tight axial sliding movement takes place between said tubular shaft and said stationary withdrawal conduit of said second withdrawing means.

2. Apparatus as recited in claim 1 further comprising a mounting plate extending between said hollow support arm, and a right angle elbow connecting said hollow support arm and stationary withdrawal conduit in fluid communication around said mounting plate.

* * * * *